Oct. 29, 1957    R. D. BUHLER ET AL    2,811,332
GASEOUS FLUID TURBINE
Filed Jan. 6, 1956    2 Sheets-Sheet 1

ROLF D. BUHLER,
ALBERT P. GRAFF &
THOMAS B. MARTIN,
INVENTORS.

BY George J. Smyth
ATTORNEY.

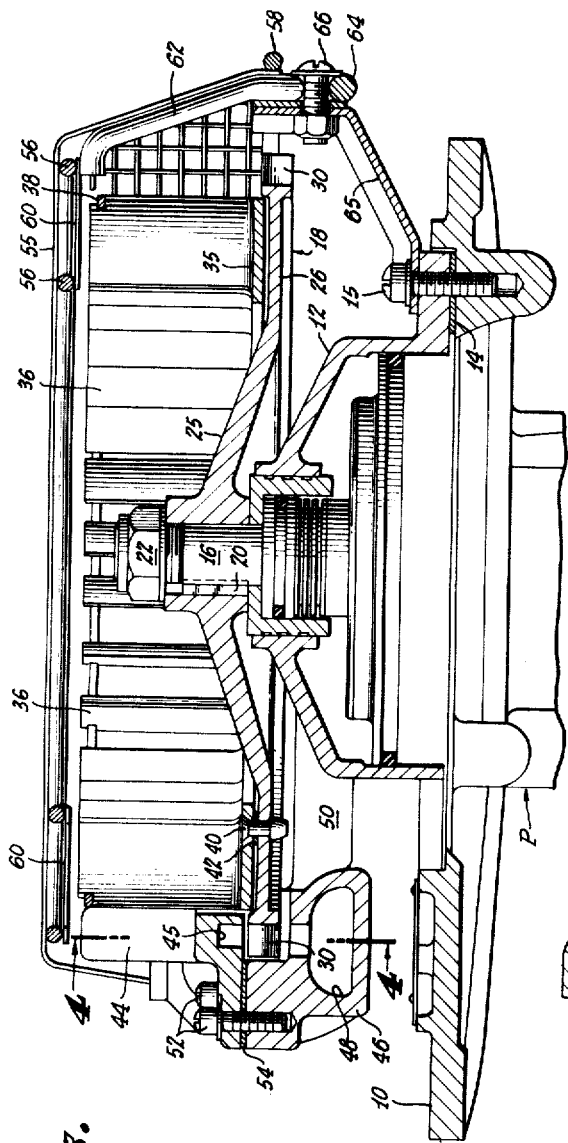
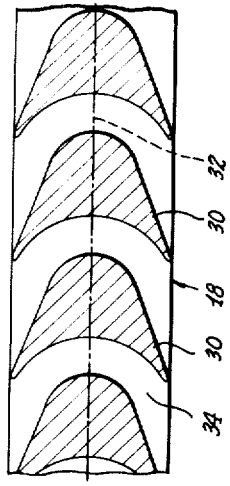
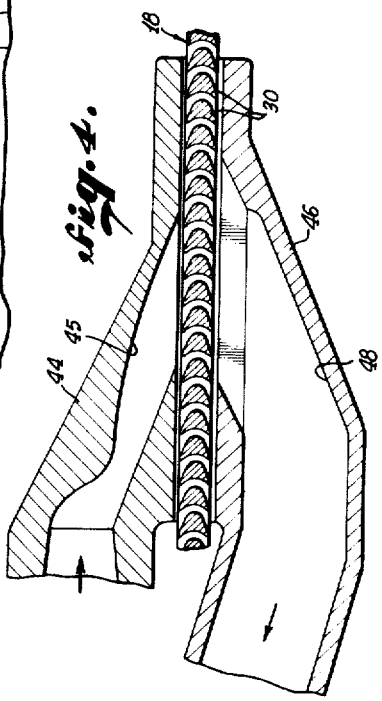

United States Patent Office 2,811,332
Patented Oct. 29, 1957

2,811,332

GASEOUS FLUID TURBINE

Rolf Dietrich Buhler, San Marino, Albert P. Graff, Los Angeles, and Thomas B. Martin, Pacific Palisades, Calif., assignors to Propulsion Research Corporation, Santa Monica, Calif., a corporation Application January 6, 1956, Serial No. 557,790

10 Claims. (Cl. 253—59)

This invention relates to a turbine that is actuated by gaseous fluid to serve as a prime mover for various purposes and is being initially embodied in a turbine for actuating a fuel transfer pump on an aircraft. This initial embodiment of the invention is described herein in detail by way of disclosure and will provide adequate guidance for those skilled in the art who may have occasion to apply the same principles to other specific purposes.

The initial embodiment of the invention as a fluid motor for actuating a fuel transfer pump on an aircraft has been developed specifically to meet the following requirements:

(1) The turbine is to operate with relatively high torque at relatively low speed in response to a relatively high pressure drop of the gaseous fluid. The pressure drop may be, for example, 10 or 12 atmospheres.

(2) Since the turbine operates continuously during flight of the aircraft and is under zero load part of the time, it must incorporate effective overspeed control.

(3) The turbine is to be actuated by hot exhaust gases from a jet-type engine without being excessively heated by the gases. The temperature of the gases, for example, may be in a range 400° F. to 550° F.

(4) Axial thrust is to be avoided not only for the sake of balanced operation but also to eliminate the necessity for a thrust bearing.

(5) The turbine is to be as light in weight as possible.

(6) All of the hot gaseous actuating fluid must be carried away from the interior of the aircraft with no leakage whatsoever in the region of the turbine.

(7) The turbine must be a reliable trouble-free device having a minimum number of moving parts to require minimum maintenance and attention.

In general the initial embodiment of the invention meets these requirements by the following provisions:

(1) To provide a relatively high torque at relatively low R. P. M. in response to a relatively high pressure drop of the gaseous fluid, a single partial admittance nozzle is used, the term "partial admittance" referring to the fact that the nozzle stream is restircted to a relatively small portion of the circumference of the rotor.

(2) Inherent overspeed control is achieved by providing the turbine with fan blades so arranged with respect to location, size, camber, etc., as to create sufficient aerodynamic resistance for adequate speed control under zero load conditions. The normal operating speed of the rotor under normal pumping load is approximately 4000 R. P. M. and the maximum free running speed under no pumping load is approximately 12,000 R. P. M.

(3) To avoid excessive heating of the turbine structure by the hot gaseous actuating fluid, the fan blades that are employed for overspeed control are arranged to create cooling air currents across surfaces of the turbine.

(4) As will be explained, axial thrust is avoided by a combination of rotor, nozzle, and diffuser that results in equalization of the static pressure on the two faces of the rotor.

(5) Lightness of weight is achieved, in part, by using light weight material, in part, by eliminating the need of a heavy thrust bearing, and, in part, by omitting the use of an over-all casing. Instead of a casing enclosing the whole rotor, the invention provides a relatively small nozzle passage structure on one side of the rotor and a corresponding relatively small diffuser passage structure on the other side of the rotor.

(6) Discharge of the hot gaseous fluid at a point remote from the rotor without leakage in the region of the rotor is accomplished by connecting the turbine diffuser to a discharge duct in communication with the atmosphere and thereby lowering the pressure of the hot exhaust gas in the region of the rotor to below atmospheric pressure so that atmospheric air, in effect, leaks into the turbine instead of the hot exhaust gas leaking out of the turbine.

(7) Reliability and trouble-free operation is achieved by the simplicity of the structure. With overspeed control accomplished inherently, the rotor assembly is the only moving part of the fluid motor.

While the initial embodiment of the invention provides the particular combination of features listed above to meet a particular set of requirements, it is to be understood that other practices of the invention may omit one or more of these features. For example, the invention may be used in an installation where weight saving is not important or were it is not necessary to keep the temperature of the rotor substantially below the temperature of the actuating fluid.

The various features and advantages of the invention may be understood from the following detailed description taken with the accompanying drawings.

In the drawings, which are to be regarded as merely illustrative:

Figure 3 is a diametrical sectional view of the turbine portion of the pump unit;

Figure 4 is a fragmentary section taken as indicated by the line 4—4 of Figure 3 to show the construction of the nozzle and diffuser; and Figure 5 is an enlarged portion of Figure 4 showing the configuration of the blades or buckets of the turbine.

Figure 1:
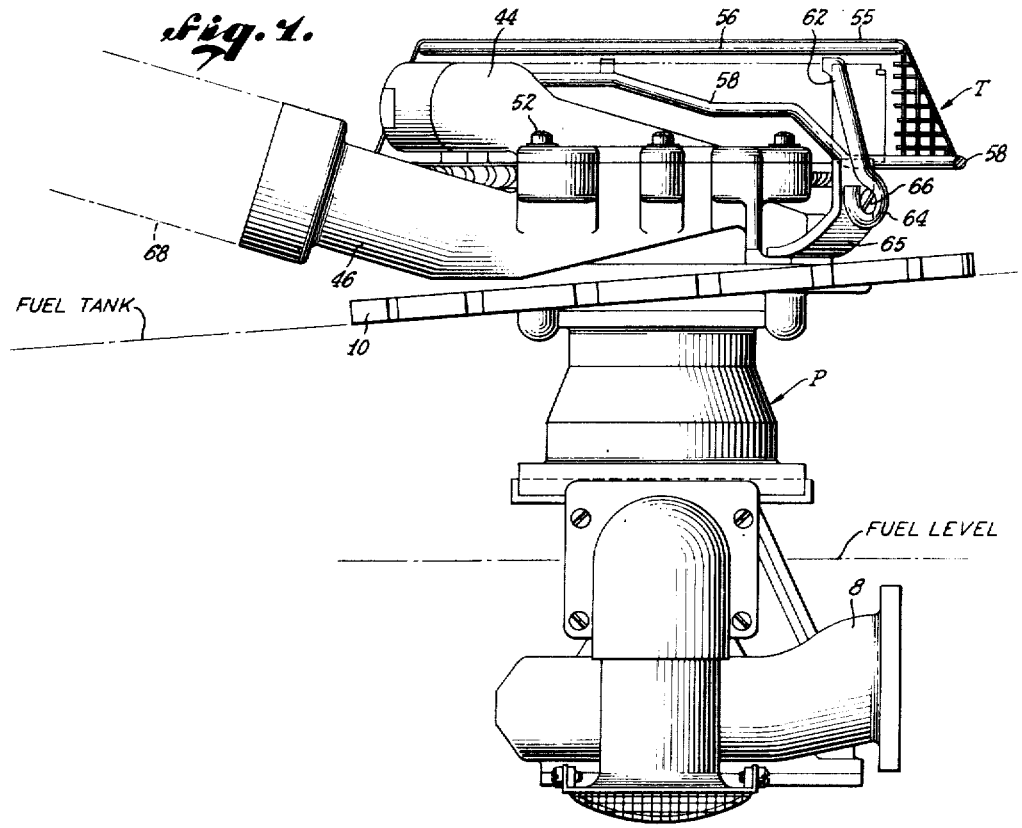
Figure 1 is a side elevation of the initial embodiment of the invention as part of a fuel pump unit for use on an aircraft.

Figure 1 illustrates a pumping unit for use on an aircraft to transfer fuel from a wing tank. The unit comprises a fuel pump, generally designated by the letter P, for use inside a fuel tank, a mounting plate 10 for supporting the unit on the fuel tank, and an embodiment of the present invention in the form of a turbine, generally designated by the letter T, which is positioned outside of the tank for actuating the pump by means of the hot exhaust gases from a jet-type engine of the aircraft. The fuel pump P has an intake 8 at its lower end and an output extension 9 (Figure 2) above the mounting plate 10.

As best shown in Figure 3, a support structure in the form of a housing 12 is mounted on the mounting plate 10 in a fluid tight manner by means of a gasket 14 and suitable screws 15, the housing 12 enclosing the upper end of the pump structure. The drive shaft 16 of the pump extends upward from the housing 12 and the rotor of the turbine, which is generally designated by numeral 18, is fixedly mounted on the upper end of this shaft by means of a spline 20 and a nut 22.

The rotor 18 has a central downwardly sloping conical web 25 which merges into a radial web 26 and this radial web terminates in a circumferential series of radially projecting turbine buckets or blades 30. As best shown in Figure 5, the blades 30 are crescent-shaped in general cross-sectional configuration and are symmetrical relative to a central plane of rotation that is indicated by the dotted line 32. Thus the successive pairs of turbine blades 30 form blade passages 34 which are also symmetrical with respect to the plane 32, each of the blade passages 34 being of minimum cross-sectional area at the plane 32 and expanding progressively in both directions from that plane.

The fan blades for aerodynamic overspeed control may be provided in various ways in various practices of the invention. In the present construction, a fan assembly is mounted on the rotor for rotation therewith. This fan assembly may comprise a base ring or annular plate 35, a circumferential series of fan blades 36 mounted on the base ring and a light upper ring 38 that interconnects the upper ends of the fan blades. The base ring 35 approximates the radial dimension of the radial web portion 26 of the rotor 18 and is mounted on the rotor by circumferentially spaced rivets 40. Preferably small spacer washers 42 surround the various rivets 40 to provide a small vertical clearance between the fan assembly and the rotor web 26. With the fan assembly attached to the rotor at a relatively few spaced points by the rivets 40 and with this vertical spacing between the fan assembly and the rotor, minor changes in the configuration and dimensions of the fan assembly as caused by temperature changes may occur without applying undue stress to the rotor.

It is apparent that with the circular series of fan blades 36 exposed to the atmosphere, rotation of the rotor causes the fan blades to function in the manner of a centrifugal blower. Fresh air from the atmosphere is drawn axially downward against the central conical web 25 of the rotor and is driven radially outward through the spaces formed by the successive fan blades 36.

Figure 2:
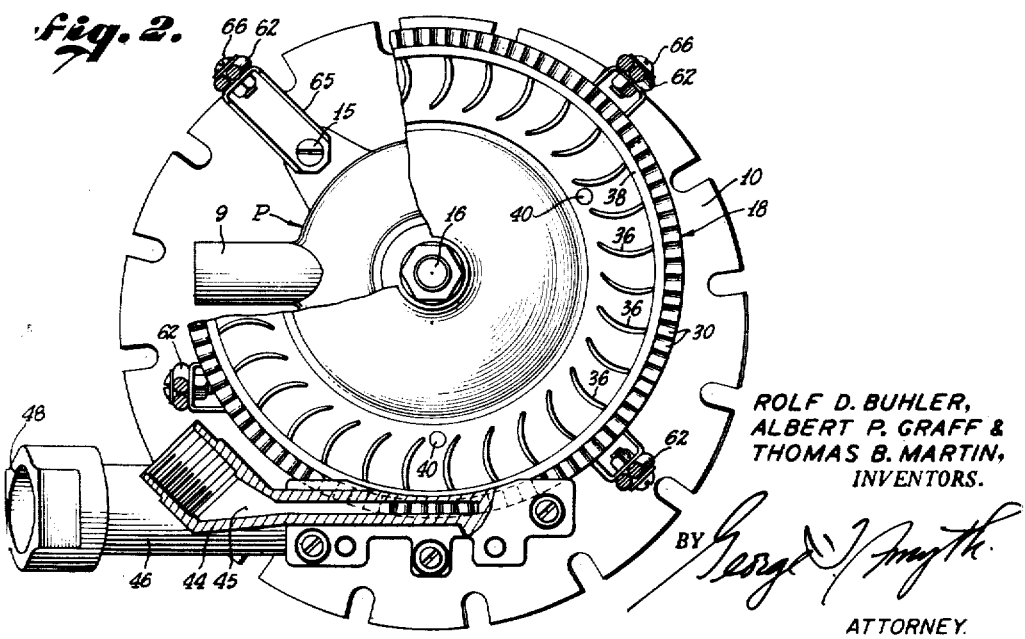
Figure 2 is a plan view of the unit shown in Figure 1 with parts broken away and with parts shown in section.

The turbine is completed by a nozzle passage structure 44 forming a nozzle passage 45 and a diffuser passage structure 46 forming a single diffuser passage 48. In the construction shown, the diffuser passage structure 46 is integral with the housing 12, being connected to the housing proper by a plurality of radial webs 50, and the nozzle passage structure 44 is supported by the diffuser passage structure. As shown in Figures 2 and 3 the nozzle passage structure 44 may be attached to the diffuser passage structure 46 by means of a plurality of screws 52 with a suitable heat-resistant gasket 54 interposed between the two structures. It may be noted in Figure 2 that the uppermost nozzle passage structure 44 lies just outside the radial zone of the upright fan blades 36.

Preferably a suitable guard is provided for both the fan assembly and the exposed turbine blades 30. A suitable guard for this purpose comprises an inverted wire basket 55 reinforced by an upper pair of concentric wire rings 56 and by a lower peripheral wire 58, this lower ring being of angular offset configuration as shown in Figure 1. Preferably, the two upper wire rings 56 support an additional inner annular screen 60 of relatively fine mesh in the radial region of the fan blades 36 as additional protection in this critical region. The wire basket 55 is further reinforced by a plurality of circumferentially spaced heavy wire members 62 that extend downwardly from the annular screen 60 inside the wire basket and are looped to form eyes 64 on their lower ends. In the construction shown, the wire basket is supported by angular brackets 65, the upper ends of which are connected to the heavy wire members 62 by screws 66 extending through the eyes 64. The lower ends of the angular brackets are anchored by the previously mentioned screws 15.

The nozzle passage configuration results in a uniform velocity front as the gas stream reaches the rotor and the total cross-sectional area of the restricted central portions of the turbine blade passages 34 (at the plane 32) that are exposed to the nozzle passage 45 at any given instant is at least as large as the total cross-sectional area of the nozzle passage adjacent the turbine rotor, the cross-sectional area of the nozzle passage being measured normal to the direction of flow. Since the nozzle passage is at an acute angle to the rotor, the cross-sectional area of the nozzle passage along the plane of contact with the rotor is greater than the cross-sectional area normal to flow, the ratio of the two areas being the cosine of the angle of inclination of the nozzle passage relative to the axis of rotation of the rotor. Thus the total cross-sectional area of the nozzle passage is not substantially less than the area of intersection of the nozzle passage with the rotor divided by the cosine of the angle of inclination of the nozzle passage relative to the axis of rotation.

It will be noted in Figure 2 that the nozzle passage 45 at the plane of intersection with the rotor is substantially narrower than the turbine blade height to achieve the desired relationship in cross-sectional areas. Making the nozzle passage narrower than the blade passages compensates for the fact that the passages exposed to the nozzle passage are separated by the thicknesses of the turbine blades.

The diffuser passage 48 is, of course, larger in cross section than the nozzle passage and progressively expands in cross-sectional area to cause consequent rise in the static pressure. In this instance, the diffuser passage 48 communicates with an exhaust duct 68, indicated by dotted lines in Figure 1, which serves to carry the exhaust gas to the exterior of the aircraft. The exhaust duct 68 may be, for example, 20 or more inches long. The progressively expanding diffuser passage 48 is of a configuration and length to cause the pressure of the exhaust stream to rise to a sufficiently high pressure to compensate for the pressure drop in the duct 68 and thus to cause effective discharge of the exhaust gas into the atmosphere.

As a result of the passage configurations shown in the drawings and the stated cross-sectional area relationships, the static pressures of the actuating fluid on the two faces of the rotor are balanced to obviate axial thrust on the rotor and, moreover, sub-atmospheric static pressure prevails inside the diffuser passage in the zone immediately adjacent to the rotor. Instead of gaseous fluid leaking into the atmosphere, atmospheric air is drawn into the diffuser passage.

As heretofore indicated, the actuating gas may be supplied to the turbine at a pressure on the order of 10 to 12 atmospheres and at a temperature which may range, for example, from 400° to 550° F. The gas stream reaches a velocity on the order of Mach 2 at the entrance to the blade passages and consequently is discharged into the diffuser passage with sufficient velocity to drop the static pressure below atmospheric pressure.

Heat is transferred from the hot gas to the rotor, but the rotor temperature remains moderate by virtue of the cooling air streams created by the speed-controlling fan blades. In this regard a feature of the invention is that the cooling air flows radially outward along the rotor surface counter to the radially inward direction of heat conduction.

Our description in specific detail of this initial embodiment of the invention will suggest to those skilled in the art various changes, substitutions and other departures from my disclosure that properly lie within the spirit and scope of the appended claims.

We claim:

1. A gaseous fluid turbine having in combination: a rotor with a circumferential series of turbine blades; a nozzle passage structure adjacent one face of said rotor and positioned to direct gaseous fluid against said blades at an acute angle to the plane of rotation of the rotor; and a diffuser passage structure positioned adjacent the other face of the rotor for cooperation with said nozzle passage structure to exhaust the gaseous fluid from the region of said blades in the direction opposite to the direction of the rotor and at an acute angle to the plane of rotation of the blades, said two passage structures extending over only a minor portion of the rotor and the series of blades with the major portion of the rotor and series of blades exposed to the atmosphere, the total cross-sectional area of the gaps between the blades exposed to the nozzle stream as measured normal to the direction of flow through the blades being not substantially less than the order of magnitude of the cross-sectional area of the nozzle stream at the plane of contact with the blades divided by the cosine of the angle of the axis of the nozzle stream relative to the axis of rotation of the rotor, the cross-sectional area of the diffuser passage at the plane of discharge from the blades being substantially greater than said magnitude with sub-atmospheric pressure prevailing in the region of the latter area to cause air flow from the atmosphere along the rotor into the diffuser passage structure thereby preventing leakage of the gaseous fluid into the atmosphere at the rotor.

2. A gaseous fluid turbine as set forth in claim 1 in which the cross-sectional area of the diffuser passage measured normal to the direction of the diffuser flow increases progressively in the direction of flow to cause the static pressure in the diffuser to rise above atmospheric pressure.

3. A gaseous fluid turbine as set forth in claim 2 in which said diffuser is connected to a duct discharging into the atmosphere at a point remote from the turbine; and in which the diffuser raises the static pressure of the discharge stream to a magnitude sufficiently above atmospheric pressure to at least compensate for the static pressure drop in said duct.

4. A gaseous fluid turbine as set forth in claim 1 in which at least one of said two passage structures lies outside an inner radial zone of said rotor; and in which said rotor carries a series of fan blades in said inner zone to perform work on the surrounding atmosphere, said fan blades being dimensioned and positioned on the rotor to create sufficient aerodynamic resistance for overspeed control when the rotor is under substantially zero load.

5. A gaseous turbine as set forth in claim 4 in which said fan blade are dimensioned and positioned to limit the speed of rotation of the rotor under substantially zero load to a speed of the order of magnitude of four times the speed of rotation of the rotor under normal load.

6. A gaseous fluid turbine as set forth in claim 1 which includes a series of fan blades on at least one face of said rotor positioned away from the radial zone of the corresponding passage structure and exposed to the atmosphere to provide aerodynamic overspeed control when the load on said rotor is reduced below normal, said blades being positioned to direct cooling air currents onto the surface of the rotor to keep the temperature of the rotor relatively low when the turbine is actuated by a high temperature gaseous fluid.

7. A gaseous fluid turbine having in combination: a rotor with a circumferential series of turbine blades; a nozzle passage structure adjacent one face of said rotor positioned to direct gaseous fluid against said blades at and acute angle to the plane of rotation of the blades; and a diffuser passage structure adjacent the other face of the rotor and registered with said nozzle passage structure to exhaust the gaseous fluid in the direction opposite to the direction of rotation of the rotor and at an acute angle to said plane of rotation, said two passage structures extending over only a minor portion of the series of blades with the major portion of the rotor and the series of blades exposed to the atmosphere, whereby gaseous fluid suppied to said nozzle passage structure at relatively high pressure results in relatively low speed rotation of said rotor at relatively high torque under a normal rotor load; and at least one series of fan blades on said rotor outside the radial zones of said two passage structures to perform work on the surrounding atmosphere and thereby to create sufficient aerodynamic resistance for overspeed control when the load on the rotor drops, said blades being positioned to throw the air radially outward thereby to cause radial flow of the air across the face of the rotor to cool the rotor.

8. A gaseous fluid turbine having in combination: a rotor with a circumferential series of radially extending turbine blades; a nozzle passage structure adjacent one face of said rotor and positioned to direct gaseous fluid against said blades at an acute angle to the plane of rotation of the blades; and a diffuser passage structure adjacent the other face of the rotor and registered with said nozzle passage structure to exhaust the gaseoue fluid at an acute angle to the plane of rotation of the rotor in the direction opposite to the direction of rotation of the rotor, said two passage structures extending over only a minor portion of the series of blades with the major portion of the series of blades exposed to the atmosphere whereby gaseous fluid supplied to said nozzle structure at relatively high pressure results in relatively low speed rotation of said rotor at relatively high torque under a normal rotor load; and a circular series of fan blades exposed to the atmosphere on at least one of the two faces of said rotor away from the radial zone of the corresponding passage structure to create aerodynamic resistance for overspeed control when the load on the rotor drops.

9. An axial-flow, pneumatic turbine including a turbine rotor having a circumferential series of blades in combination with a radial flow cooling fan on the same rotor for aerodynamic overspeed regulation of the turbine by power absorption when the load on the turbine drops to a relatively low magnitude and for cooling action on the rotor, said fan and the major portion of said rotor being exposed to the open atmosphere, said turbine having a single nozzle passage to direct a stream of gaseous fluid against one side of a relatively small peripheral portion of said rotor, said turbine having a single diffuser passage on the other side of said portion of the rotor, the total cross-sectional area of the passages between the blades of the rotor in the zone of the nozzle passage being at least on the order of magnitude of the cross-sectional area of the nozzle passage measured normal to the direction of flow, the cross-sectional area of said diffuser passage progressively increasing in the direction of flow, whereby the static fluid pressures on the opposite faces, respectively, of the rotor in the region of said two passages are substantially balanced.

10. A gaseous fluid turbine having in combination; a rotor with a circumferential series of radially extending turbine blades; a single nozzle passage structure adjacent one face of said rotor and positioned to direct gaseous fluid against said blades at an acute angle to the plane of rotation of the blades; and a single diffuser passage structure adjacent the other face of the rotor and registered with said nozzle passage structure to exhaust the gaseous fluid from the region of said blades in the direction opposite to the direction of rotation of the rotor and at an acute angle to the plane of rotation of the blades, said two passage structures extending over only a minor portion of the rotor and series of blades with the major portion of each side of the rotor and series of blades exposed to the atmosphere, said turbine blades being shaped symmetrically with reference to a central plane of rotation of the rotor with the passages between successive blades restricted to a minimum cross-sectional dimension along said plane and progressively increasing in width in both directions from said plane with the two ends of the blade passages directed at acute angles to the plane of rotation to conform to the passages in said two passage structures, the total cross-sectional area of the passages between the blades at said central plane in the zone of the nozzle passage being at least as large as the cross-sectional area of the nozzle passage measured normal to the direction of flow, the cross-sectional area of the diffuser passage adjacent the rotor being larger than said cross-sectional area of the nozzle passage and progressively increasing in the direction of flow, the static fluid pressures on the opposite faces, respectively, of the rotor in the region of the two passage structures being substantially balanced to eliminate axial thrust across the rotor.

References Cited in the file of this patent

UNITED STATES PATENTS

| | | |
|---|---|---|
| 708,815 | Krank | Sept. 9, 1902 |
| 840,040 | Callan | Jan. 1, 1907 |
| 1,156,549 | Perry | Oct. 12, 1915 |
| 1,170,547 | Kennedy | Feb. 8, 1916 |
| 1,180,403 | Leblanc | Apr. 25, 1916 |
| 1,410,726 | Schoonmaker | Mar. 28, 1922 |
| 2,109,997 | Hoffmann | Mar. 1, 1938 |
| 2,492,672 | Wood | Dec. 27, 1949 |

FOREIGN PATENTS

| | | |
|---|---|---|
| 551,667 | Great Britain | Mar. 4, 1943 |

UNITED STATES PATENT OFFICE
CERTIFICATE OF CORRECTION

Patent No. 2,811,332                                                     October 29, 1957

Rolf Dietrich Buhler et al.

It is hereby certified that error appears in the printed specification of the above numbered patent requiring correction and that the said Letters Patent should read as corrected below.

Column 5, line 49, for "blade" read --blades--; line 68, for "and" read --an--; column 6, line 2, for "suppied" read --supplied--; line 20, for "gaseoue" read --gaseous--.

Signed and sealed this 21st day of January 1958.

(SEAL)
Attest:
KARL H. AXLINE
Attesting Officer

ROBERT C. WATSON
                                                  Commissioner of Patents